United States Patent [19]
Vincent et al.

[11] Patent Number: 5,997,082
[45] Date of Patent: Dec. 7, 1999

[54] STOWABLE CONTAINER HOLDER

[75] Inventors: Clyde L. Vincent, Holland; Jeffrey L. Barber, Zeeland, both of Mich.

[73] Assignee: Prince Corporation, Holland, Mich.

[21] Appl. No.: 09/058,595

[22] Filed: Apr. 10, 1998

[51] Int. Cl.⁶ ................................................. A47C 7/62
[52] U.S. Cl. ............................. 297/188.19; 297/188.16; 248/311.2; 248/313
[58] Field of Search ................... 297/188.01, 188.14, 297/188.15, 188.16, 188.19; 284/311.2, 313, 316.5, 685, 686; 224/42.35, 549, 483, 282

[56] References Cited

U.S. PATENT DOCUMENTS

| | | |
|---|---|---|
| 2,649,270 | 8/1953 | Franks . |
| 4,583,707 | 4/1986 | Anderson . |
| 4,749,112 | 6/1988 | Harper . |
| 4,759,584 | 7/1988 | Dykstra et al. . |
| 4,984,722 | 1/1991 | Moore . |
| 5,018,633 | 5/1991 | Toth et al. . |
| 5,072,909 | 12/1991 | Huang . |
| 5,167,392 | 12/1992 | Henricksen ............................ 248/311.2 |
| 5,190,259 | 3/1993 | Okazaki .................................. 248/311.2 |
| 5,191,679 | 3/1993 | Harper . |
| 5,275,779 | 1/1994 | Marfilius et al. . |
| 5,318,266 | 6/1994 | Liu . |
| 5,318,343 | 6/1994 | Spykerman et al. ............... 297/188.16 |
| 5,342,009 | 8/1994 | Lehner . |
| 5,423,508 | 6/1995 | Isenga et al. . |
| 5,601,268 | 2/1997 | Dunchock ............................ 248/311.2 |
| 5,603,477 | 2/1997 | Deutsch ............................... 248/311.2 |
| 5,865,411 | 2/1999 | Droste et al. ......................... 248/311.2 |

*Primary Examiner*—Laurie K. Cranmer
*Attorney, Agent, or Firm*—Price, Heneveld, Cooper, DeWitt & Litton

[57] ABSTRACT

A container holder includes a base for mounting within a recess in a vehicle accessory, such as an armrest or console of a vehicle, a cover pivotally mounted to the base and movable between a position substantially flush with the surface of the accessory and pivotally movable to a generally vertically extended position defining a support wall to which a container holding arm or arms are pivotally mounted at an end remote from the pivotal connection of the cover to the base. In a preferred embodiment of the invention, a leaf spring mounted to the cover to releasably hold the cover in a closed position and in a vertically extended use position. In a preferred embodiment also, this spring also releasably holds the container holder arm in a horizontally extended use position.

22 Claims, 3 Drawing Sheets

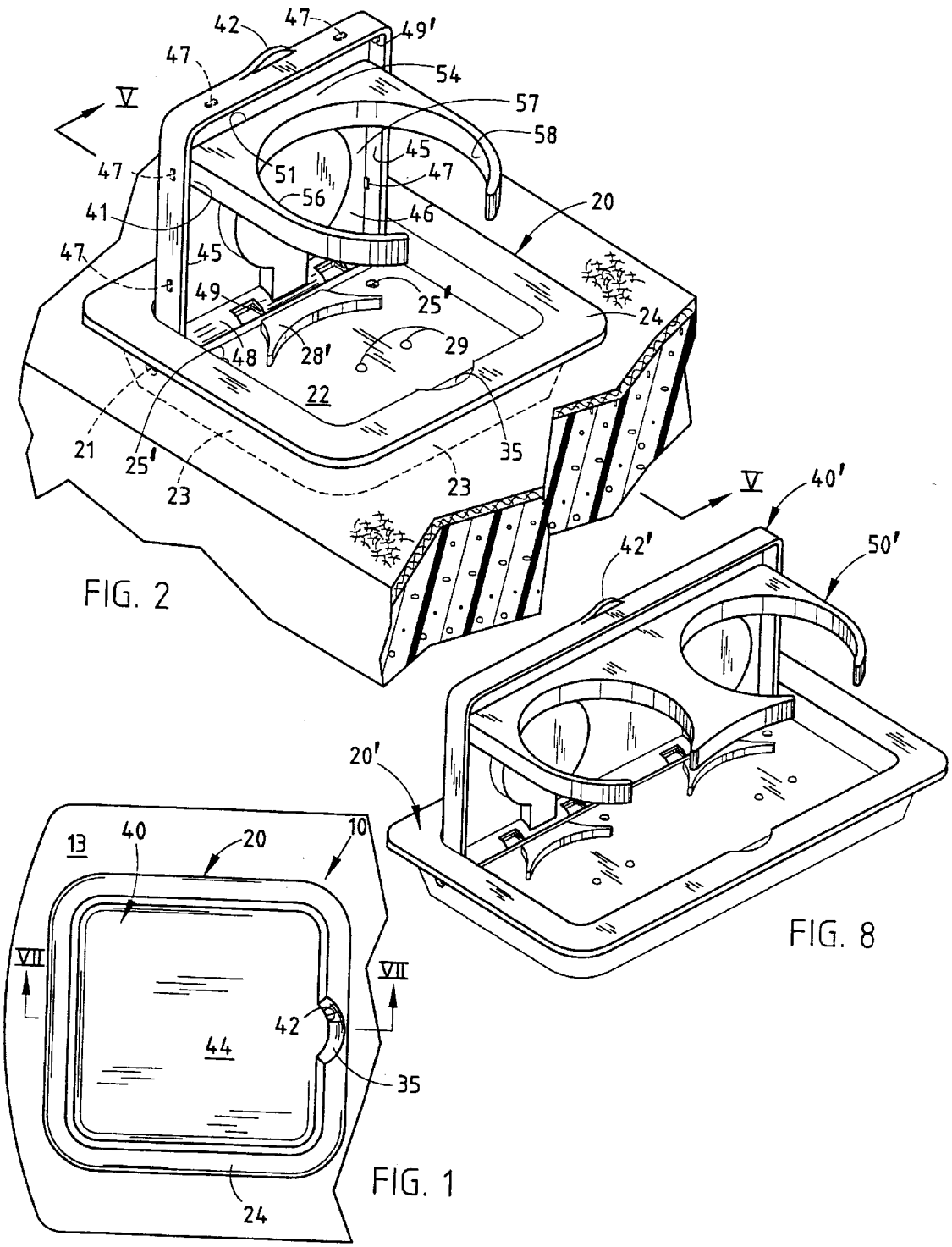

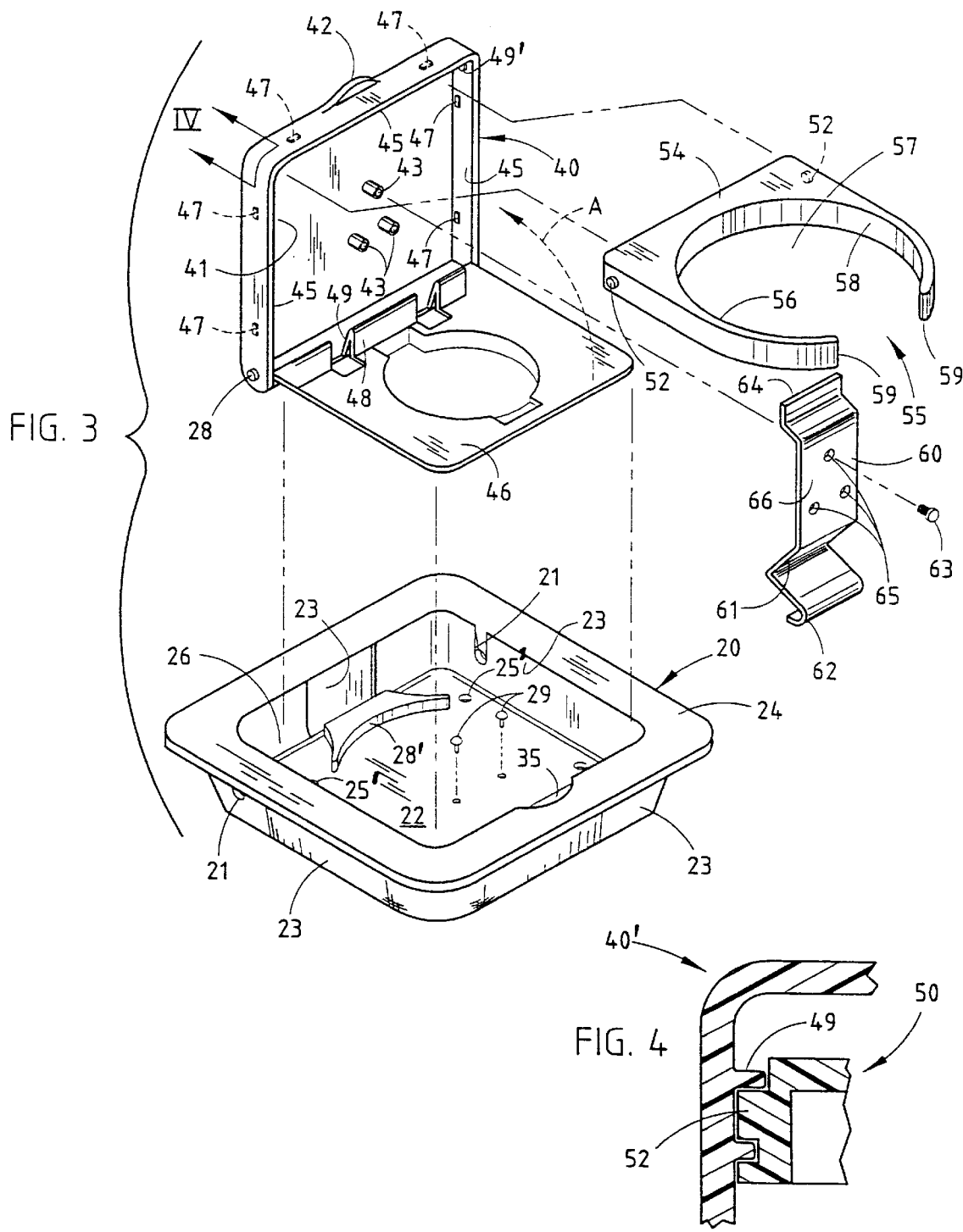

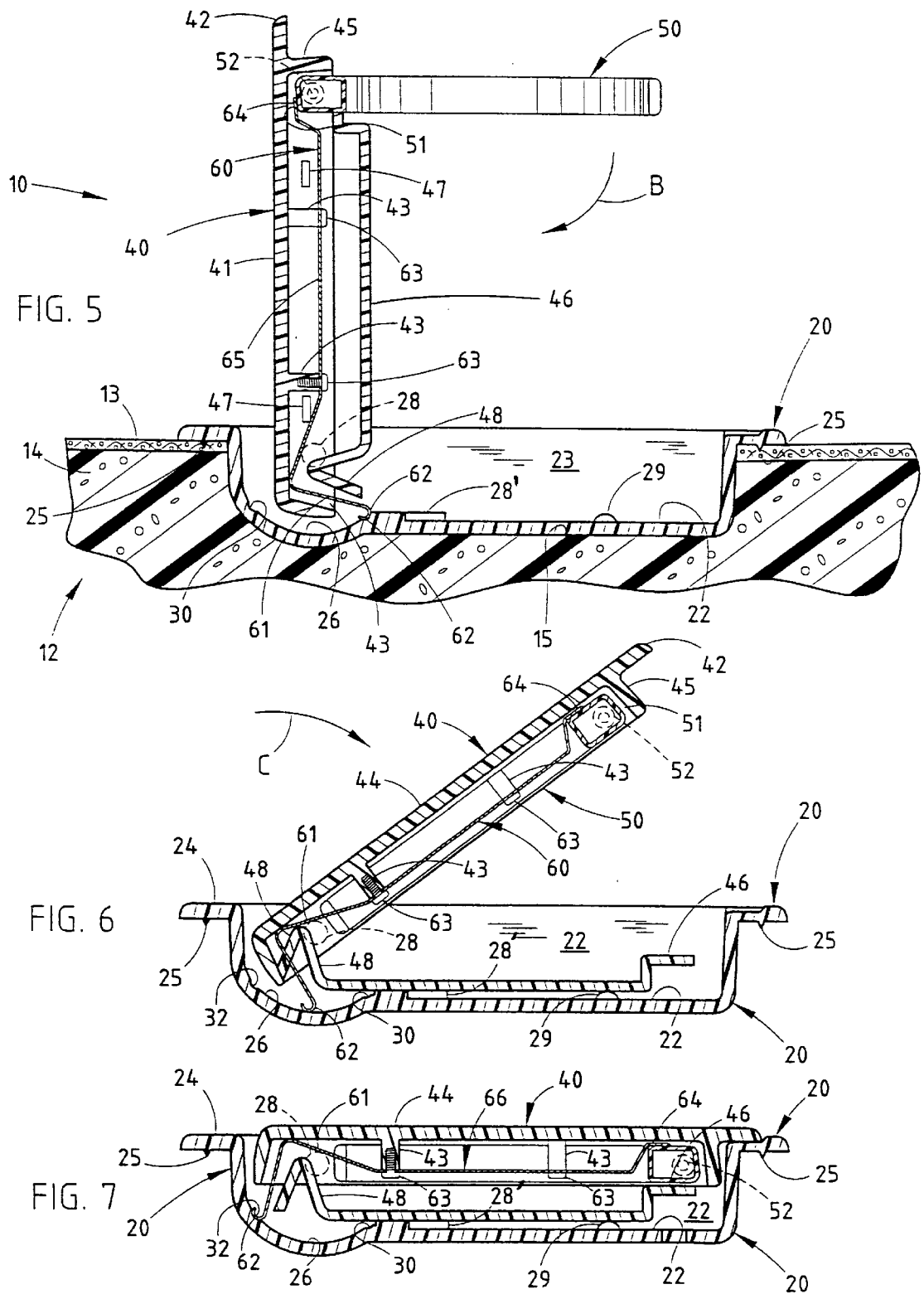

STOWABLE CONTAINER HOLDER

BACKGROUND OF THE INVENTION

The present invention relates to a container holder for a vehicle and particularly one which can be recessed within an armrest console or other vehicle accessory for storage.

Container holders are becoming popular accessories in vehicles, allowing the convenience of a driver or passenger to drink coffee or a soft drink while enduring monotonous commutes to and from work or otherwise in transit. Such container holders safely hold hot coffee or other beverages, preferably at a location in the vehicle which is easily used by the vehicle operator or passenger. Container holders frequently are located in an armrest or center console to position a beverage container in an area which can be easily used by the vehicle operator without distracting the operator from the attention needed for operating the vehicle. There exists a wide variety of container holders which move between stored positions within armrests or consoles and use positions extended therefrom so that when not in use they do not detract from the interior appearance of the vehicle or use of other vehicle accessories. U.S. Pat. No. 4,759,584 discloses a variety of container holders which pop-up or pivot outwardly from an armrest or both in their movement between stored and use positions. U.S. Pat. No. 5,018,633 discloses another type of container holder which pivots upwardly and outwardly from a vehicle console for use.

There also exists a variety of after-market container holders used on boats or vehicles which collapse and include a vertical mounting wall with a pivot-down floor and pivot-up arcuate arms, allowing the wall to be mounted to a generally vertically extending surface with the floor pivoting downwardly and forming a base for supporting the bottom of a container supported in spaced relationship from the base by the arcuate arms. There remains a need for a collapsible container holder for installation as original equipment in a vehicle and which is small, has few moving parts, is inexpensive and yet is durable and easy to use.

SUMMARY OF THE PRESENT INVENTION

The container holder of the present invention improves upon existing container holders by providing a three-piece container holder with each section pivotably coupled to a cover and bias means controlling the movement of the individual members between a collapsed stored position and an expanded use position. In a preferred embodiment of the invention, the container holder includes a base for recessed mounting within an armrest or console of a vehicle in a generally horizontal plane, a cover pivotally mounted to the base and movable between a position substantially flush with the surface of the armrest and pivotally movable to a generally vertically extended position defining a support wall to which container holding arm or arms are pivotally mounted at an end remote from the pivotal connection of said cover to said base. In a preferred embodiment of the invention, bias means are provided for releasably holding the cover in a closed position while allowing the cover to pivot from the closed position to a vertically extended use position. The bias means also releasably holds the cover in such vertically extended use position. In a preferred embodiment also, bias means are provided for holding the container holder arms in a horizontally extended use position when the cover is pivoted to the use position. In a preferred embodiment, the bias means constitute a single longitudinally extending leaf spring having one end extending between the base and cover and an opposite end extending between the cover and container support arms. In a preferred embodiment also, the base, cover, and arms can be individually integrally molded of a polymeric material and snapped together for pivotal motion relative to their adjacent member. Such a container holder, therefore, provides a relatively inexpensive, reliable and easy to use container holder which is mounted in a substantially flush alignment with the upper surface of an armrest or console of a vehicle and can be easily opened using one hand to a spring-loaded use position when desired.

These and other features, objects and advantages of the present invention will become apparent upon reading the following description thereof together with reference to the accompanying drawings.

BRIEF DESCRIPTION OF THE DRAWINGS

FIG. 1 is a fragmentary top plan view of a container holder of the present invention mounted in a vehicle accessory, shown in a stored position;

FIG. 2 is a fragmentary perspective view of the container holder shown in FIG. 1, shown in an expanded use position;

FIG. 3 is an exploded perspective view of the components of the container holder shown in FIGS. 1 and 2;

FIG. 4 is a fragmentary enlarged cross-sectional view, taken along section line IV—IV in FIG. 2;

FIG. 5 is a vertical cross-sectional view of the container holder shown in FIGS. 1 and 2, taken along section line V—V in FIG. 2;

FIG. 6 is a vertical ross-sectional view of the structure shown in FIG. 5, shown with the container holder partially collapsed;

FIG. 7 is a cross-sectional view of the structure shown in FIGS. 1–6, taken along section lines VII—VII of FIG. 1; and FIG. 8 is a perspective view of an alternative embodiment of the present invention, shown partly in phantom form.

DETAILED DESCRIPTION OF THE PREFERRED EMBODIMENT

Referring initially to FIGS. 1 and 2, there is shown a container holder 10 of the present invention which is mounted to a vehicle accessory 12, such as an armrest or console. In the embodiment shown, accessory 12 is an armrest which, as seen in FIG. 5, includes an upholstered surface 13 and a foam polymeric body 14 which can be mounted to the vehicle in a conventional manner to allow the armrest to move between a horizontally extended use position for use of the container holder and armrest or a vertically stored position. The armrest itself, other than providing a recess 15 for receiving the container holder 10, can be of a conventional construction.

The container holder 10 comprises a base 20, a cover 40 pivotally mounted to the base 20 and a container holder arm or arms 50 pivotally mounted to the cover at an end remote from the pivotal mounting of cover 40 to base 20. The container holder further includes bias means 60 (FIGS. 3–7) which extend between the base, cover, and container support arms as described below for urging and holding the container holder between stored and use positions. Having briefly described the major components of the container holder 10, a detailed description of the structure now follows.

The base, as best seen in FIGS. 2 and 3, is generally square shaped and includes a recessed floor 22 spanned by four vertically extending integral sidewalls 23 terminating in an integral outwardly projecting peripheral bezel 24 having downwardly projecting, spaced barbs 25 (FIG. 5) which serve to engage the edge of the armrest upholstery 13 providing a trim appearance to the mounting of the armrest within recess 15 of armrest 12. The base further includes a semicylindrical socket 26 formed in the floor along one edge providing clearance for the pivotally mounted cover 40. A stub pivot axle 28 (FIG. 3) extends from opposite corners of the cover 40 and into slotted aperture 21 in opposed sidewalls 23 of base 20 for the snap-in assembly of the cover to the base and for pivotally mounting the cover 40 to the base, as best seen in FIG. 5. Base 20 may also optionally include an arcuate shoulder 28' for engaging the lower peripheral wall of a cylindrical container seated on the floor 22 of base 20. Floor 22 may also include spaced aperture for receiving rubber bumpers 29 (FIG. 3) and mounting apertures 25' for receiving fasteners for securing base 20 within the armrest recess 15. Bumpers 29 are engaged by cover 40 when collapsed, as seen in FIGS. 1 and 7, to prevent any noise as the vehicle traverses rough terrain.

The semicylindrical socket 26 in the floor 22 of base 20 includes a pair of semicylindrical recesses 30, 32 (FIGS. 5–7) for holding cover 40 by receiving a first curved end 62 of elongated leaf-type bias spring 60 which extends within cover 40 as described in greater detail below. End 62 thus snap-fits within recess 30 for holding the container holder in a collapsed stored position, as shown in FIGS. 1 and 7, or within recess 32 for holding the container holder in an expanded use position, as shown in FIGS. 2 and 5. Although pivot axles 28 extend from cover 40, the base 20 could likewise contain a pivot axle which snap-fits within an aperture in cover 40, thus, reversing the parts. Either construction or snap-in cradle-type sockets can be provided to provide the pivot connection of the cover to the base in a conventional manner. The base 20 also includes a recess 35 in the rearwardly extending leg of bezel 24 allowing the user to access an opening tab 42 on cover 40 for moving the container holder from a stored position, shown in FIG. 1, to a use position, shown in FIG. 2.

Cover 40 comprises a top wall 41 with an outer decorative surface 44 which may be pebble-grain textured or otherwise textured to match similarly textured bezel 24 and provide a desirable surface finish for use in a vehicle. Alternatively, the cover surface 44 can be upholstered, if desired, to match the upholstery 13 on the armrest 12. Cover wall 41 includes a peripheral lip 45 extending therearound with the leg of lip 45 opposite the pivot connection of cover 40 to base 20 including a finger tab 42 for extension of the container holder. The cover further includes an inner wall 46 mounted to the inside surface of peripheral lip 45 in spaced relationship to the top 41 providing a space therebetween, as best seen in FIGS. 5–7, for receiving the bias spring 60. Wall 46 is held to the peripheral lip 45 by tabs 47, as shown in FIG. 2. Wall 46 terminates in spaced relationship from the upper leg of lip 45 to allow clearance for the second end 64 of spring 60 to extend therefrom and communicate with a pivot arm 50. Inner wall 46 also extends around pivot axles 28 and includes a lower leg 48 spaced from the lip 45 to allow curved end 62 of spring 60 to extend into the hemispherical recess 26 and its slots 30 and 32 during movement of the cover. Wall 46 can be integrally molded with cover lip 45 and joined by an integral "living-hinge" 49 or otherwise attached to cover wall 41 or sides of opposed legs of peripheral lip 45. A top edge of peripheral lip 45 includes a pair of sockets 49' on opposite sides for receiving stub pivot axles 52 of arms 50, as best seen in FIG. 4, where one such socket 49' is shown, the other side having an identical structure. The inner surface of the top 41 of cover 40 includes three spaced, apertured mounting bosses 43 (FIG. 3) for receiving screws 63 extending through apertures 65 in spring 60 for mounting the spring to the cover 40 prior to the pivoting of wall 46 in a direction indicated by arrow A in FIG. 3 to its assembled position covering the spring. the inner surfaces of cover lip 45 may include tabs 47 (FIG. 3) snap-locking wall 46 in place upon assembly. Preferably, the components 20, 40 and 50 of the container holder are individually integrally molded of a resilient polymeric material such as polypropylene, ABS or the like to allow the fold and snap-together assembly.

Container supporting arm 50 includes a base 54 with a pair of outwardly extending arcuate arms 56 and 58 extending therefrom, each having rounded tips 59 terminating in spaced relationship from one another defining a gap 55 therebetween to allow a handle of a container, such as a coffee mug, to fit within arm 50 for ease of use of the container holder. In some embodiments, arm 50 may include a continuous solid member having a circular opening in place of the gap defined by the arcuate arms of the preferred embodiment.

Spring 60 is an elongated spring steel member surface treated for the automotive environment and having a width of substantially one-third or less the width of the container holders as best seen in FIGS. 2 and 3, and a lower leg 61 inwardly offset from the main body 66 of the spring 60 and terminating in the curved tip 62 which snap-fits within recesses 30 and 32. The upper end of spring 60 terminates at end 64 which engages the rear wall 51 of arm 50, as best seen in FIG. 5, for holding the arm 50 in a raised, generally horizontal use position, as seen in FIGS. 2 and 5. Alternatively, the bias means comprising spring 60 can be separate springs extending from opposite ends of the cover to achieve the desired control functions. Preferably, however, the spring is a continuous leaf spring of the configuration shown in FIGS. 3 and 5–7 and mounted as shown to the cover 40.

In operation, assuming the container holder is in an open position as shown in FIGS. 2 and 5, first arm 50 is collapsed against the vertically extending cover 40 by rotating the arm downwardly in the direction indicated by arrow B in FIG. 5. Next, as indicated by arrow C in FIG. 6, the cover with the arm 50 collapsed within the peripheral lip 45 thereof is moved into the recessed floor 22 of the base 20 to the stored position shown in FIGS. 1 and 7. To open the container holder the process is reversed by first pulling upwardly on tab 42, rotating the cover in a direction opposite arrow C in FIG. 6 and subsequently pulling the arm 50 outwardly in a direction opposite arrow B in FIG. 5 to extend the container holder to the use position. In the use position, the bias spring 60 holds the arm 50 in a generally horizontal position and holds the wall defining cover 40 in a vertically extended position by the detented cooperation between end 62 of spring 60 and recess 32 in base 20. In this position, the circular aperture 57 defined by arms 56 and 58 is aligned above floor 22 with arcuate shoulder 28' aligned with aperture 57 below and in spaced relationship thereto. In some embodiments, the shoulder 28' may not be desired and can be removed from the floor if desired. The dimensions of the arm 50 is selected to nestably fit within the peripheral lip 45 of cover 40 while the outer dimension of the peripheral lip 45 of cover 40 is selected to allow the cover to nestably fit within the sidewalls 23 of base 20. When in the collapsed stored position as shown in FIGS. 1 and 7, this construction allows the flush mounting of the container holder into the top surface of a vehicle accessory such as an armrest or console, thereby providing a trim neat appearance to an OEM vehicle installation.

In the embodiment of the invention shown in FIG. 8, a container holder 10' of substantially the same construction as container 10 in FIGS. 1–7 is disclosed and includes an arm assembly 50' defining a pair of circular openings 57' and 57". In FIG. 8, the arm 50' is shown in phantom form in the stored collapsed position under the cover 40' which is mounted to the base 20' in the same manner as the first embodiment. Basically, the cover and base are elongated, rectangular in shape instead of generally square as in the first embodiment, to accommodate the dual openings 57', 57" of arm 50'. In the embodiment shown in FIG. 8, a pair of bias springs 60' and 60" are mounted between the cover, arm and base in the same manner as the first embodiment to provide additional bias force for the larger container holder so defined. Thus, the container holder of the present invention, thus, may incorporate single or dual container openings as desired.

These and other modifications to the preferred embodiments of the invention can be made by those skilled in the art without departing from the spirit or scope of the invention as defined by the appended claims.

The invention claimed is:

1. A container holder for mounting within a recess in a horizontally extending support member comprising:
   a base defining a recessed floor and a peripheral bezel for mounting substantially flush with an upper horizontally extending surface of a vehicle support member;
   a cover pivotally mounted to said base and movable between a stored position within the recess of said base and a use position orthogonal to said stored position;
   a container holding arm pivotally mounted to said cover at an end of said cover remote from the pivotal connection of said cover to said base; and
   bias means extending between said base and said cover for releasably holding said cover in a collapsed stored position and a generally vertically extended use position and between said cover and said arm for releasably holding said arm in a horizontally extended use position.

2. The container holder as defined in claim 1 wherein the bias means comprises a single elongated leaf spring.

3. The container holder as defined in claim 2 wherein said floor of said base includes a semicylindrical section having a pair of angularly spaced detents formed therebetween and said spring includes one end releasably extending into one of said detents for holding said cover in a stored position and the other of said detents for holding said cover in a vertically extended use position.

4. The container holder as defined in claim 3 wherein said spring includes an end opposite said one end for engaging said arm when in said use position for holding said arm in said use position.

5. The container holder as defined in claim 4 wherein said base, cover and arm are each integrally molded of a polymeric material.

6. The container holder as defined in claim 5 wherein said polymeric material is one of polypropylene and ABS.

7. An armrest comprising;
   an armrest body having an upholstered upper surface with a recess formed downwardly therein;
   a base having a bezel and a recessed floor for mounting within said recess with said bezel substantially flush with said upholstered upper surface of said armrest;
   a cover pivotally mounted to said base and movable between a stored position within said base, said cover having an outer surface substantially flush with the peripheral bezel of said base, said cover pivotally movable to a vertically extended use position; and
   a container holding arm pivotally mounted to said cover at an end of said cover remote from the pivotal connection of said cover to said base, said arm movable from a collapsed position parallel with the plane of said cover to a use position generally parallel with said floor of said base.

8. The armrest as defined in claim 7 and further including bias means extending between said base and said cover for detenting said cover in a collapsed stored position and a generally vertically extended use position and between said cover and said arm for releasably holding said arm in a horizontally extended use position.

9. The armrest as defined in claim 8 wherein the bias means comprises a single elongated leaf sprig.

10. The armrest as defined in claim 9 wherein said floor of said base includes a pair of spaced detents and said spring releasably engages one of said detents for holding said cover in a stored position and the other of said detents for holding said cover in a vertically extended use position.

11. The armrest as defined in claim 10 wherein said spring further engages said arm when in said use position for holding said arm in said use position.

12. The armrest as defined in claim 11 wherein said base, cover and arms are each integrally molded of a polymeric material.

13. The armrest as defined in claim 12 wherein said polymeric material is one of polypropylene and ABS.

14. A container holder comprising:
   a base defining a recessed floor;
   a cover pivotally mounted to said base and movable between a stored position within the recessed floor of said base and a use position, said cover having an outer wall and an inner wall spaced from said outer wall;
   a container holding arm pivotally mounted to said cover at an end of said cover remote from the pivotal connection of said cover to said base; and
   a spring extending between said inner and outer walls of said cover and having one end engaging said base for releasably holding said cover in a collapsed stored position and a generally vertically extended use position and an opposite end engaging said arm for releasably holding said arm in a horizontally extended use position.

15. The container holder as defined in claim 14 wherein the spring is an elongated leaf spring.

16. The container holder as defined in claim 14 wherein said floor of said base includes a semicylindrical recess having a pair of angularly spaced detents formed therein and one end of said spring is rounded to releasably extend into one of said detents for holding said cover in a stored position and the other of said detents for holding said cover in a vertically extended use position.

17. The container holder as defined in claim 14 wherein said inner and outer walls of said cover are integrally molded of a resilient polymeric material.

18. A container holder comprising:
   a base having a generally square peripheral lip defining a bezel, and downwardly extending sides coupled to a recessed floor for mounting said base with said bezel substantially flush within a recess of a vehicle accessory;
   a cover pivotally mounted to said base and movable between a stored position with the sides of said base and an orthogonally extended use position, said cover having an outer surface substantially flush with said bezel of said base when in said stored position;

a container holding arm pivotally mounted to said cover at an end of said cover remote from the pivotal connection of said cover to said base; and an elongated leaf spring extending between said cover and said base and arm for releasably holding said cover in a collapsed stored position and a generally vertically extended use position and releasably holding said arm in a horizontally extended use position, wherein said cover includes spaced apart inner and outer walls and said spring is positioned between said walls.

19. The container holder as defined in claim 18 wherein said floor of said base includes spaced detents and said spring includes an end releasably extending into one of said detents for holding said cover in a stored position and the other of said detents for holding said cover in a vertically extended use position.

20. The container holder as defined in claim 19 wherein said base, cover and arm are each integrally molded of a polymeric material.

21. The container holder as defined in claim 20 wherein said arm is formed by a pair of facing arcuate arms.

22. The container holder as defined in claim 21 wherein said polymeric material is one of polypropylene and ABS.

\* \* \* \* \*